United States Patent [19]

Carlsson et al.

[11] Patent Number: 5,307,957
[45] Date of Patent: May 3, 1994

[54] BEVERAGE DISPENSING VEHICLE WITH A PUMP

[76] Inventors: Ingmar Carlsson, Söder Mälarstrand 71, Stockholm, Sweden, S-11725; Jan Åkerlind, Öregrundsgatan 7, Stockholm, Sweden, S-11541

[21] Appl. No.: 930,523

[22] PCT Filed: Feb. 22, 1991

[86] PCT No.: PCT/SE91/00138
§ 371 Date: Sep. 30, 1992
§ 102(e) Date: Sep. 30, 1992

[87] PCT Pub. No.: WO91/12758
PCT Pub. Date: Sep. 5, 1991

[30] Foreign Application Priority Data

Feb. 26, 1990 [SE] Sweden .................................. 9000687

[51] Int. Cl.⁵ .................................... B67D 5/60
[52] U.S. Cl. ................... 222/144.5; 222/610; 222/400.8; 222/401; 312/249.11
[58] Field of Search ............. 222/144.5, 192, 209, 222/608, 610, 609, 628, 401, 400.8; 312/249.11, 402, 403, 330.1; 186/40, 45, 45

[56] References Cited

U.S. PATENT DOCUMENTS

| 769,894 | 9/1904 | Fitzpatrick | 215/4 |
| 3,868,123 | 2/1975 | Berg et al. | 312/249.11 |
| 5,072,858 | 12/1991 | Brashier | 222/144.5 |

FOREIGN PATENT DOCUMENTS 861606  2/1941  France ......................... 222/209

*Primary Examiner*—Andres Kashnikow
*Assistant Examiner*—Philippe Derakshani
*Attorney, Agent, or Firm*—Jacobson, Price, Holman & Stern

[57] ABSTRACT

The invention relates to an arrangement for dispensing hot beverages and comprises a container (3) having thermally insulated walls which fully seal the interior of the container. The container can be inserted into a holder (1) and drawn from said holder through a given distance to a lockable position in which the container interior can be connected to a pouring spout (5) and pump means (7), owing to the fact that the spout (5) can be extended from a protected position in a recess in the upper side of the container (3) and therewith expose holes (10a, 31a) in the containerwalls (31) and sealingly connect these holes to the pouring spout (5a) and the pump means (7).

4 Claims, 2 Drawing Sheets

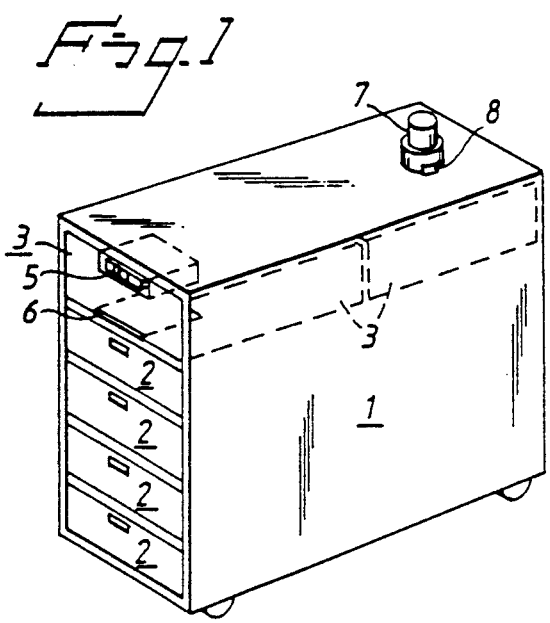
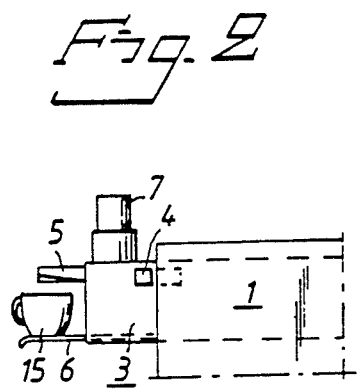
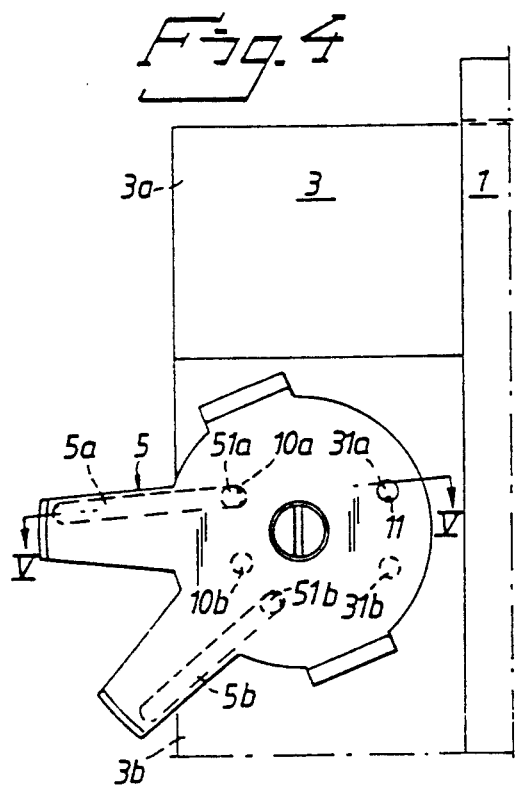
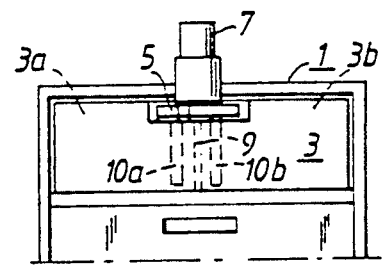
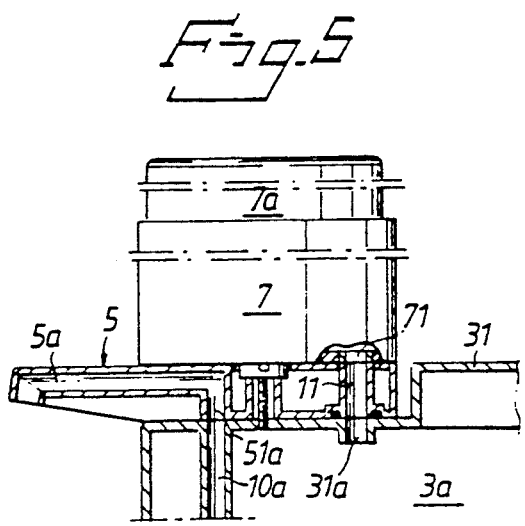

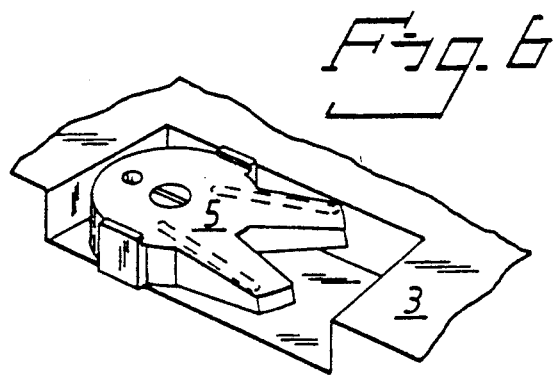
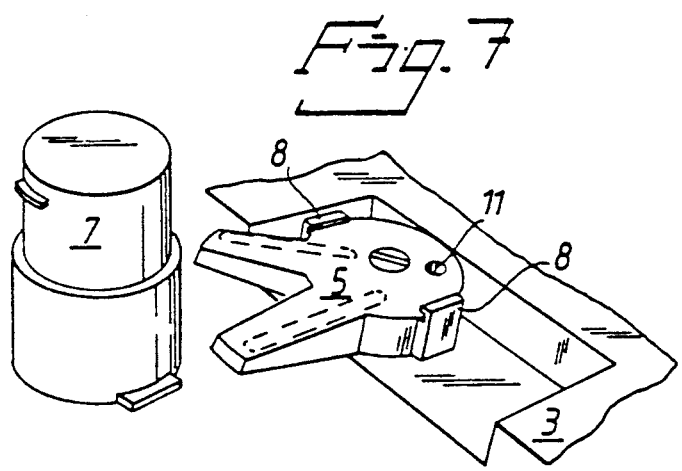
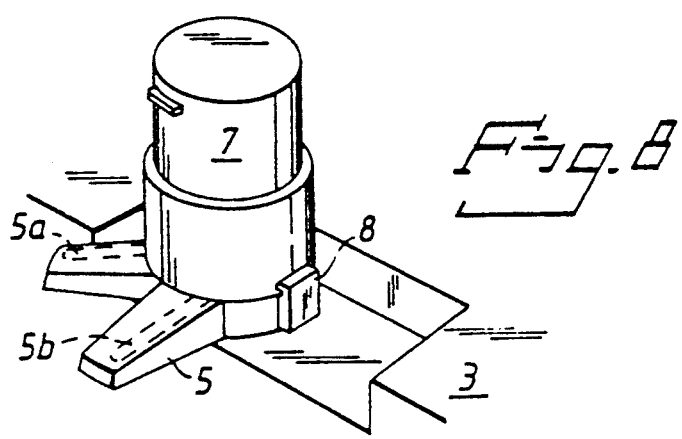

BEVERAGE DISPENSING VEHICLE WITH A PUMP

BACKGROUND OF THE INVENTION

The present invention relates to an arrangement for dispensing hot beverages.

There has long been a need for such dispensers and a wide variety of dispensers are known to the art.

Large stainless steel beverage dispensing containers which are fitted with a lid incorporating a filling opening, and a pouring spout fitted in the lower region of the container and provided with valve means are well known to the art. The valve means is often self-closing, so as to eliminate the risk of the valve being left open unintentionally.

Other types of beverage dispensers include so-called pump thermoses which are replenished from a larger hot beverage source as the need arises.

The simplest hot beverage dispenser, and perhaps the most suitable, or more correctly the least unsuitable, is the conventional thermos flask or thermos jug having a volumetric capacity of about 1-2 liters.

All of these beverage dispensers are encumbered with serious drawbacks, however, at least in the context of large dispensers. The large dispensers fitted with a pouring spout and valve means are clumsy and are seldom cleaned properly. Furthermore, the valve is not always properly closed, therewith allowing more or less liquid to run from the dispenser container, causing serious damage to the surfaces on which the liquid runs.

Pump thermoses are often cleaned by quickly rinsing the thermos in water. Such cleaning is highly inadequate. When such thermoses are replenished or filled, liquid will readily spill from the thermos, and due to the tall, narrow shape of the thermos, there is a risk of the thermos toppling, therewith spilling a large part of its contents. Thermos flasks and jugs are also encumbered with these drawbacks. An additional drawback resides in the injury to arms and shoulders due, among other things, to the strains occasioned by uncomfortable working positions when serving beverages from such dispensers.

One area where these problems are particularly manifest and where every conceivable attempt to reach a good solution has been made for more than 50 years is the passenger aircraft field. The problem is exacerbated by confined spaces and stress. In an attempt to solve these problems, SAS have recently carried out analyses at a cost of SEK 3 million. The best solution that could be reached was a carefully ergonometrically refined coffee and tea thermos made of plastic.

With regard to those drawbacks which were analyzed but for which no suitable solution could be found it can be mentioned that the thermos flask system requires:
1. That an electric water heater is installed on the aircraft, which necessitates summoning a repair technician in the event of a breakdown;
2. That a system of water-carrying vehicles is provided, wherein prior to starting-up an aircraft, it must be possible for such a vehicle to reverse in towards the aircraft and deliver, for instance, 40 liters of water through a hose fitted with an external filling nipple;
3. That the water supplied shall be of uniform good quality, which is not always the case since the vehicle must often wait over long periods in a hot environmental atmosphere;
4. That the water heater, the tank of the water-carrying vehicle and the thermos flasks must be cleaned on a regular basis.

Other drawbacks are that the thermoses take-up a large area of the free space on the serving trolleys that are used to serve hot beverages and accessories, such as cakes, sugar, milk, cream, etc. Furthermore, there is a risk that the thermos flasks will topple, for instance when the aircraft flies in air pockets or yaws in flight, etc. When the beverages are poured out in the pantry, a large amount of liquid is usually spilled. This liquid spillage gradually collects in the bottom of the aircraft fusilage, causing serious corrosion and rot damage, which is difficult to prevent.

SUMMARY OF THE INVENTION

The object of the present invention is to provide a solution to the aforesaid problems and therewith eliminate said drawbacks. This is achieved in accordance with the invention with a hot beverage dispensing arrangement having the characteristic features set forth in the characterizing clause of claim 1. The dispensing containers, which have a volumetric capacity of 5-10 liters and are provided with heat-insulated walls, are filled through a central opening with a prepared hot beverage and since the dispensing containers are completely sealed, they can be handled and transported to their place of use as readily as any other item of baggage. The dispensing containers can be inserted in holders at their place of use, and thus stowed out of the way until needed for use, at which time they can be withdrawn slightly from the holders to a position in which a pouring spout and pump means mounted on the upper side of the containers are accessible, said spout and pump means preferably being well protected.

According to one preferred embodiment of the invention, defined in claim 2, the pouring spout can be swung to a position of use while establishing, at the same time, a connection between the container interior and the spout and pump means.

The dispenser container is preferably divided into two compartments, one for coffee and one for tea, and the pouring spout is preferably pivotal between two positions in which the spout and the pump means are selectively connected to one or the other of said compartments.

According to a further embodiment, defined in claim 4, the pump means is detachable from the dispenser prior to the container being pushed into its holder, therewith enabling the dispenser to be placed snuggly beneath a shelf or the like and therewith save space. The pump means is also intended to be removed from the container when removing said container from its holder in order to replenish the contents thereof, thereby protecting said pump means against damage when thus handling the dispenser. The inventive beverage dispenser obviates the need of a separate transport organization for supplying water for the preparation of hot beverages, and the central preparation of coffee and tea reduces the consumption of powder coffee and powder tea by half.

The invention will now be described in more detail with reference to the accompany schematic drawings which illustrate an exemplifying embodiment of an inventive beverage dispenser of the kind suitable for use on serving trolleys used onboard passenger aircraft. In the drawings,

BRIEF DESCRIPTION OF THE DRAWINGS

FIG. 1 is a perspective view of a serving trolly with an inventive beverage dispenser in a fully inserted position;

FIG. 2 is a side view showing the dispenser in its position of use;

FIG. 3 is a front view, partially in section, showing the upper part of the trolly in FIG. 1 with the dispenser container and the pump means in their positions of use;

FIG. 4 is a top view of the pouring spout in an outwardly swung position;

FIG. 5 is a sectional view taken on the line V—V in FIG. 4;

FIG. 6 is a perspective view of the pouring spout in its withdrawn position;

FIG. 7 is a view similar to that of FIG. 6 but with the pouring spout and the pump means swung outwardly and while fitting the pump means; and FIG. 8 is a view similar to that of FIG. 7 but showing the pump means when fitted.

DETAILED DESCRIPTION OF THE PREFERRED EMBODIMENTS

FIG. 1 illustrates a conventional serving trolly 1 of the kind used by passenger airlines, for instance. The trolly is provided with drawers 2 at each end thereof, and a top counter or serving surface. In the case of the illustrated embodiment, the uppermost drawer at each end of the trolly has been replaced with a container 3 having thermally insulated walls which fully seal the interior of the container. The containers 3 are withdrawably mounted in the same manner as the drawers 2, but are fitted with a latching mechanism (not shown) which locks the containers in the position shown in FIG. 2 and which must be released with the aid of a lever 4, in order to enable the containers 3 to be fully drawn out.

Each container 3 is mounted beneath the counter surface of the trolly and an outwardly swingable pouring spout 5 is arranged in a recess provided in the upper side of the container 3. A withdrawable plate or board 6 is mounted in a recess formed in the underside of the container, this plate 6 also functioning as a handle when drawing out the container 3. The container 3 lacks fragile or easily damaged outwardly projecting parts and can therefore be handled without needing to take undue care. The only component that can be damaged easily is the pump means 7 mounted on the upper side of the container. For the sake of safety, however, the pump means 7 is intended to be connected to the container 3 only when said container is to be used and prior to use is either placed in a clamping device 8 on the trolly counter surface or in one of the drawers 2.

Since it shall be possible to serve either coffee or tea, each container 3 is divided into two compartments 3a and 3b by a partition wall 9, as illustrated in FIG. 3 The pouring spout 5 can be swung between two different positions, such that in one position the spout 5 will be connected either to a delivery pipe 10a or to a delivery pipe 10b, said pipes being mounted in a respective compartment 3a and 3b and opening out adjacent the bottom thereof. The pump means is connected, at the same time, to the selected compartment 3a or 3b in a manner hereinafter described.

FIG. 4 shows the pouring spout 5 in one of said outwardly swung positions. The pump means 7 has been removed, as has also a disposable protector plate which is intended to be clamped by the clamping device 8 on the upper planar side of the spout during transportation of the container 3. The spout 5 has a pouring channel 5a which merges with a downwardly directed opening 51a centrally of the upper orifice of the pipe 10a. A bore 11 or channel opens at one end into the planar upper side of the spout 5, while the other end of the bore 11 opens centrally of an opening 31a in the wall 31 of the container compartment 3a. When the pump means 7 has been mounted on the planar part of the spout 5 and clamped in position by means of the clamping means 8, the outlet orifice 71 of the pump means 7 will be located opposite the upper orifice of the bore 11, as illustrated in FIG. 5.

When the pipe 5 is swung to the other of its outwardly swung positions, a downwardly extending part 51b of the other pouring channel 5b of the spout will be located centrally opposite the upper orifice of the pipe 10b. At the same time, the outlet orifice 71 of the pump means 7 and the bottom orifice of the bore 11 will connect with an opening 31b in the wall 31 of the container compartment 3b. The pump means 7 comprises a downwardly depressable plunger 7a, or collapsable bellows device, which operate against the action of a spring (not shown). When the plunger is depressed, an overpressure is generated in a selected compartment 3a or 3b, depending on the position of the spout 5, and a portion of coffee or tea is dispensed through the pouring channel 5a or 5b into a cup 15 placed on the outwardly drawn plate 6 and positioned beneath a respective pouring channel.

FIG. 6 shows the spout 5 in its inwardly swung position, in which the spout is located when the container 3 is drawn-out somewhat in order to dispense a beverage. The container 3 is fully sealed when the spout is located in this position, since the spout 5 blocks all openings to the container. When the spout is swung to the position shown in FIG. 7, the pouring channel 5b is connected to the compartment 3b of the container, as is also the bore 11. The pump means 7 shall then be pushed into position on top of the planar part of the pouring spout 5, as shown in FIG. 8. The pouring channel 5a and the bore 11 in the spout 5 are connected to the compartment 3a of the container, by turning the spout 5 through one step in an anti-clockwise direction.

When the beverage has been dispensed, the pump means 7 is removed and the pouring spout 5 is turned to the position shown in FIG. 6 and the container 3 pushed in beneath the trolly counter surface. When the aircraft has landed, the container can be removed from the trolly and sent to a service station in the airport buildings, together with other pantry equipment, to be cleaned by machines and refilled with hot beverage and then transported, with other pantry equipment and foodstuffs, to a waiting aircraft, which may be different to that from which the containers were removed.

At least when using the inventive dispenser in passenger aircraft, the need for an expensive water delivery organization is obviated, while greatly enhancing the quality of the beverage and reducing the amount of work required of cabin personnel at the same time. Naturally, greater or smaller improvements are also achieved in other fields of application.

We claim:

1. A hot beverage dispensing arrangement comprising a container having a substantially sealed interior and a substantially parallelepipedic configuration with thermally insulated walls, said container being insertable into a holder which can be provided beneath a counter surface and being drawable out from said holder to a determined, lockable position in which the container interior can be connected to a pump means mounted on an upper side of the container, said container further comprising a pouring spout mounted on the upper side of the container for selectively connecting the interior of said container to atmosphere.

2. An arrangement according to claim 1, wherein the pouring spout can be swung to an outward position in which a first opening arranged on the upper side of the container and communicating with a pipe connection opening out adjacent the bottom of the container is sealingly connected to a corresponding opening of a spout pouring channel, and a second opening to the container interior is sealingly connected to the pump means.

3. An arrangement according to claim 2, wherein the container is provided with a partition wall which divides the container into two compartments; and wherein the pouring spout can be swung between two different positions in which the spout and the pump means are connected selectively to either one of said two compartments.

4. An arrangement according to claim 2, wherein the pump means can be readily detached from and replaced over a third opening provided in the upper side of the pouring spout, said third opening communicating with said second opening to the container interior when the spout is swung to said outward position.

* * * * *